United States Patent
Kelders (10) Patent No.: US 8,245,438 B2
(45) Date of Patent: Aug. 21, 2012

(54) DEVICE AND CEILING SYSTEM FOR CATCHING INSECTS IN A BUILDING SPACE

(75) Inventor: Leendert Maria Kelders, Langenboom (NL)

(73) Assignee: Inventions Care BV, KR Beuningen (NL)

( * ) Notice: Subject to any disclaimer, the term of this patent is extended or adjusted under 35 U.S.C. 154(b) by 1084 days.

(21) Appl. No.: 12/067,880

(22) PCT Filed: Sep. 22, 2006

(86) PCT No.: PCT/NL2006/000470
§ 371 (c)(1),
(2), (4) Date: Jul. 2, 2008

(87) PCT Pub. No.: WO2007/035089
PCT Pub. Date: Mar. 29, 2007

(65) Prior Publication Data
US 2009/0139155 A1    Jun. 4, 2009

(30) Foreign Application Priority Data

Sep. 23, 2005 (NL) ..................... 1030019

(51) Int. Cl.
*A01M 1/14* (2006.01)
(52) U.S. Cl. ............... 43/114; 43/113; 43/136
(58) Field of Classification Search ........... 43/114, 43/113, 136
See application file for complete search history.

(56) References Cited

U.S. PATENT DOCUMENTS

| | | | |
|---|---|---|---|
| 4,074,457 A * | 2/1978 | Sato et al. ............ | 43/113 |
| 4,686,789 A * | 8/1987 | Williams ............. | 43/113 |
| 5,915,948 A | 6/1999 | Kunze et al. | |
| 5,950,355 A * | 9/1999 | Gilbert ............... | 43/113 |
| 7,065,919 B1 * | 6/2006 | Vierra ................ | 43/136 |
| 7,383,660 B2 * | 6/2008 | Greening ............. | 43/113 |
| 8,104,223 B1 * | 1/2012 | Rodriguez ........... | 43/115 |
| 2002/0139040 A1 | 10/2002 | Burrows et al. | |
| 2003/0089023 A1 * | 5/2003 | Nelson et al. ........ | 43/113 |
| 2004/0016173 A1 * | 1/2004 | Tully et al. .......... | 43/114 |

FOREIGN PATENT DOCUMENTS

JP    2002-300837    10/2002

OTHER PUBLICATIONS

Patent Abstracts of Japan, vol. 2003, No. 02, Feb. 5, 2003.
International Search Report, PCT International Patent Application No. PCT/NL2006/000470, dated Feb. 5, 2007.
Written Opinion of the International Preliminary Examining Authority, PCT International Patent Application No. PCT/NL2006/000470, dated Nov. 7, 2007.
International Preliminary Report on Patentability, PCT International Patent Application No. PCT/NL2006/000470, dated Jan. 14, 2008.

* cited by examiner

*Primary Examiner* — Christopher P Ellis
(74) *Attorney, Agent, or Firm* — Kenyon & Kenyon LLP (57) ABSTRACT

A ceiling system includes a number of longitudinal beams and/or transverse beams to be arranged in longitudinal arrangement and/or transverse arrangement in a building space, a number of ceiling panels to be arranged on the longitudinal and/or transverse beams, and at least one insect catching device, which: a horizontal holder supported by the transverse beams and/or longitudinal beams; one or more electrical lamps for emitting ultraviolet light to the surrounding area for the purpose of attracting insects; a connecting element for connecting the lamp to the domestic mains supply; and a fixing element for fixing insects attracted by the light.

22 Claims, 5 Drawing Sheets

DEVICE AND CEILING SYSTEM FOR CATCHING INSECTS IN A BUILDING SPACE

FIELD OF THE INVENTION

The present invention relates to a device for catching insects in a space of a building. The present invention also relates to a ceiling system for catching insects in such a space.

BACKGROUND INFORMATION

It is known that insects, and particularly flying insects, can transmit diseases to humans. For this reason, and to be able to comply with the general hygiene requirements set for buildings in which food products are stored or sold, such as food shops, butcher's shops, supermarkets and so on, attempts are made to keep out insects as much as possible. In cases where exclusion of insects is not readily possible for whatever reason, for instance because the entrance doors to the space are opened often, it is important to catch these insects as quickly as possible.

Certain conventional devices for this purpose include a lamp which emits powerful ultraviolet (UV) light. Insects are attracted by this UV light, so that the insects can be lured to a determined location. In the vicinity of the UV lamp, for instance around the lamp, such a device has an electrically charged cage. When the insect, attracted by the UV light, touches the cage it is electrocuted. The insect is thus eliminated. The body of the electrocuted insect falls downward under the influence of the force of gravity into a receptacle which is provided on the underside of the device and which is cleaned periodically.

A drawback of such an electrocuting device is that, due to the electrocution of the insect, the body explodes into many parts. A number of these parts come to lie in the receptacle, but other parts of the body are spread through the space. This is undesirable, particularly in those situations where the electrocuting device is situated in the vicinity of food products.

In order to obviate this drawback, in certain catching devices, the insects, once they have been attracted by the UV light, are not electrocuted but become stuck on a sheet provided with an adhesive layer, also referred to as glue sheet. Once an insect touches this glue sheet it is caught thereby, and the insect can no longer fly further. The insects are therefore caught without causing damage to their body, and there is no chance of exploded body parts of the caught insect being spread through the space. In addition to preventing exploded parts, the glue sheet provides the advantage that caught insects can be dissected (when undamaged). It is known to arrange such catching devices in a holder and to place them on a post, or to fix them to a wall of the space. Such a catching device does however have a number of drawbacks.

Firstly, the catching device arranged against the wall or placed on an individual post or plinth takes up quite a lot of space, which space, for instance in shops, is often of great commercial value. When a catching device provided with a glue sheet is, for instance, screwed to a wall so as to protect food products placed on a number of shelves of a wall rack, the wall rack cannot contain any food products at the position of the catching device, and this prevents an efficient use of the wall surface area.

A further drawback is that the insects, once they have been caught on the glue sheet, can be seen quite clearly by the users of the space. When the catching device is, for instance, placed at eye level against a wall, which is not unusual, the glue sheet of the catching device strewn with caught insects will be visually intrusive to the user, which may give the user a disagreeable sensation. A further drawback is that special measures must often be taken to allow for correct mounting of the catching device on the wall.

Japanese Published Patent Application No. 2002-300837 describes an insect catcher mounted on the ceiling. The insect catcher is constructed from a support which is mounted on the ceiling and on which a movable holder provided with a lamp is arranged via a number of rods. By placing the catching device on and/or in the ceiling, the commercially important walls of the space can be used more efficiently. Since users, for instance, the shopping public, generally do not tend to look upward, the glue sheet with the insects caught thereon is less likely to be noticed.

The holder takes a movable form so that it can be recessed into the ceiling when no insects have to be caught, and displaced downward when the unit is used as an insect catcher. This construction is however quite complex and thereby susceptible to malfunction. The lamp for attracting the insects is moreover arranged in the movable part of the holder, which requires special measures for the electricity supply, and furthermore reduces the dimensions of the catching space, i.e., the space within which insects are attracted by the device. In the situation where it is recessed into the ceiling, the device further occupies a great deal of height, partly as a result of the fact that in such a situation the rods from which the holder hangs protrude above the support.

SUMMARY

Example embodiments of the present invention to provide a device and/or a system ceiling for catching insects in a building space, wherein at least some of the above stated drawbacks may be avoided.

According to an aspect of example embodiments of the present invention, there is provided for this purpose a device for catching insects in a building space, including: a tray-like holder; a first and second electrical lamp for emitting ultraviolet light for the purpose of attracting insects; a connecting element for connecting the lamps to the domestic mains supply; at least one cover plate which can be mounted on the holder for the purpose of at least partially shielding the lamps; a fixing element for fixing insects attracted by the light; and a mounting device for mounting the holder on and/or in a ceiling of the space. The first and second lamp are mounted on the tray-like holder in the peripheral area thereof. A uniform catching space extending all around through substantially 360 degrees can hereby be realized, which enhances the catching effectiveness of the device. Due to the cover plate, the lamps of the device will not be noticed by the users of the space, or at least less so, so that there is less chance of the glue sheet with the insects caught thereon attracting the attention of the users. The partial covering of the lamps may cause no, or hardly any, reduction in the insect-attracting effect of the lamps.

The lamp may include a fitting mounted on the holder and provided with a switching device for controlling a fluorescent lamp, in particular a fluorescent lamp. PL tubes can also be used. One or more fixing elements may be placed on the top side of one or more of the cover plates. The fixing elements can hereby no longer be seen from below, thus preventing a person in the space being able to see the fixing elements and the insects adhered thereto.

The device may include a spacing device for positioning a cover plate at a predetermined fixed distance under the holder for the purpose of at least partially shielding the lamp. The cover plate is herein provided under the holder, for instance, at a distance of between 5 and 15 cm, preferably about 8 cm, from the underside of the holder. When the cover plate has the same length and the same width as the holder, the holder is completely covered as seen from below. In this example embodiment, the cover plate can even be slightly larger than the holder so that the direct light emitted by the lamp can be well shielded. This example embodiment moreover makes it easy to provide an existing light fitting already arranged in a ceiling with an insect-catching option (retrofit situation). The normal lamp is replaced for this purpose with a UV lamp, while a cover plate with fixing element can be positioned under the existing fitting, for instance, by mounting the cover plate on the existing holder with chains, bands or other types of spacer.

The lamps may be positioned along at least two opposite peripheral edges of the holder in order to illuminate the fixing element from at least two sides. An improved light output and/or light distribution can hereby be effected, this resulting in a greater attraction for the insects. The mounting device may include one or more support edges provided along the periphery of the holder so as to provide simple arrangement of the holder on a ceiling system with a number of longitudinal and transverse beams. The insect catching device can hereby be mounted or removed quickly by respectively placing the holder on the beams or lifting it from the beams.

The holder may be adapted to be recessed almost wholly or partially into the ceiling. When the holder is recessed wholly into the ceiling, the holder, or at least the cover plates thereof, can lie flush with the rest of the ceiling so that the device acquires an attractive appearance and is hardly noticeable.

The tray-like holder may include a reflection plate. The reflection plate can be provided separately of the holder, in which case the plate is given an easy-to-mount form. The reflection plate can however also form part of the holder itself. The reflection plate may be manufactured at least partially from polished aluminum. Polished aluminum has very good reflecting properties for UV light (relative to for instance polished stainless steel), which provides a high and uniform light output.

The tray-like holder and/or reflection plate may be provided with obliquely disposed surfaces for reflecting light along a cover plate arranged thereunder. In the case of a rectangular holder, it is recommended to provide four oblique surfaces which define a ring around the lamps in order to send the light in the correct direction (in a determined manner between the underside of the holder and the edge of the cover plate).

According to an aspect of example embodiments of the present invention there is provided a ceiling system, including: a number of longitudinal beams and/or transverse beams to be arranged in longitudinal arrangement and/or transverse arrangement in a building space, a number of ceiling panels to be arranged on the longitudinal and/or transverse beams, and at least one catching device. The dimensions of the holder are adjusted so as to be able to arrange the holder fitting between the longitudinal beams and/or the transverse beams of a standard system ceiling. In an example embodiment, in which the holder takes a rectangular form, the length and/or the width of the holder corresponds substantially to the respective spaces between successive transverse beams and/or longitudinal beams. This makes it possible to equip an existing ceiling with one or more holders without further technical measures being necessary.

The insect catching device can be placed in simple manner by leaving out one of the ceiling panels of the system ceiling and arranging the holder in the space thereby made available. Not only does this make mounting of a new ceiling system relatively simple, but it is also very advantageous when the insect catching device has to be arranged in existing ceiling systems.

Further advantages, features and details of example embodiments of the present invention are described below in the following description with reference to the appended Figures.

DETAILED DESCRIPTION

Figure 1:
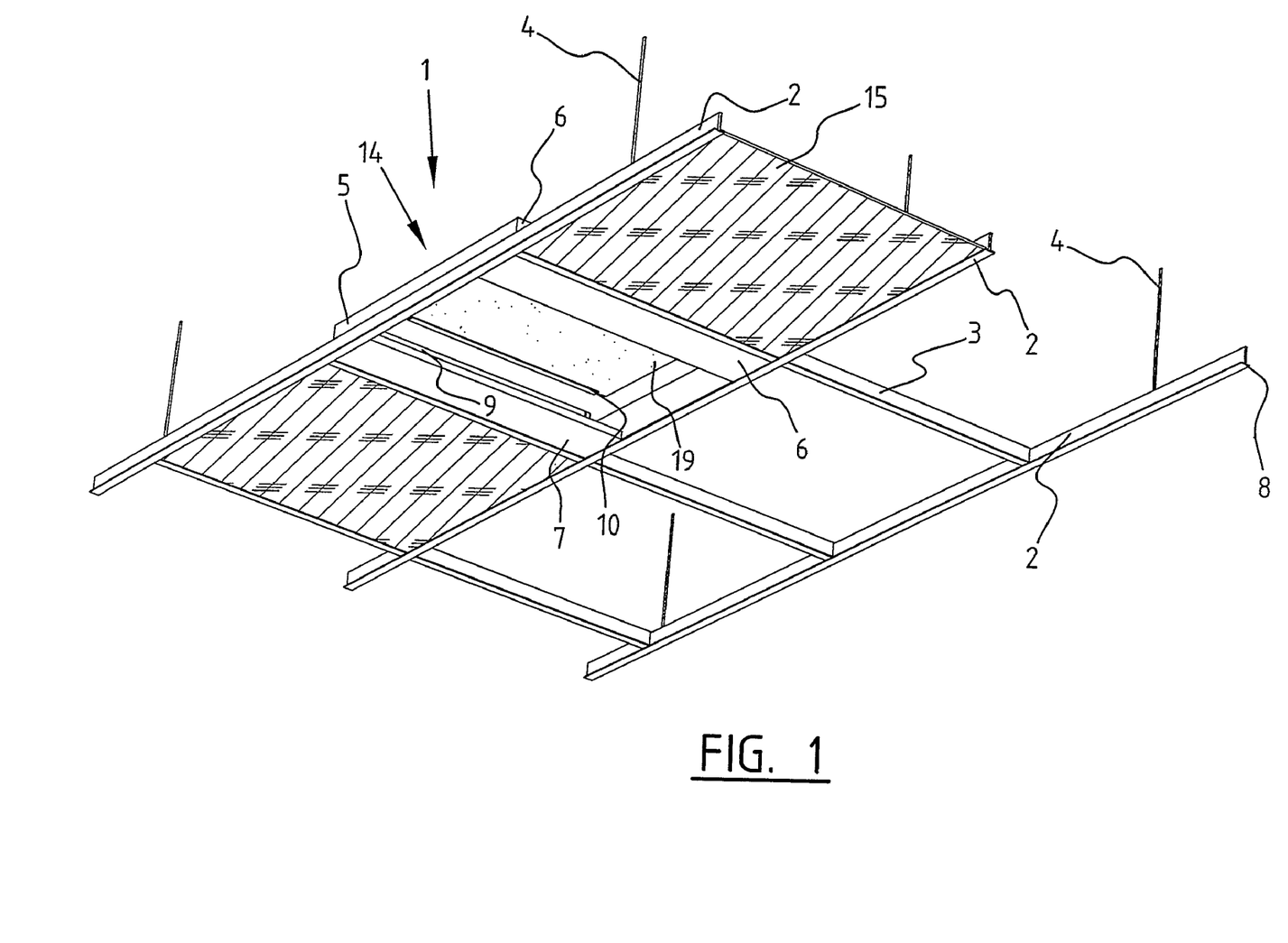
FIG. 1 is a perspective view of a ceiling system according to an example embodiment of the present invention.

FIG. 1 shows a system ceiling 1. System ceiling 1 includes a number of longitudinal beams 2, for instance, consisting of elongate T-profiles. Between longitudinal beams 2 are placed transverse beams 3, for instance, by mounting thereof in a conventional manner on longitudinal beams 2. Beams 2, 3 positioned in longitudinal and transverse arrangement form a framework in which ceiling panels 15 of predetermined dimensions can be placed. In the illustrated example embodiment, the edges of ceiling panels 15 are laid onto flanges 8 of the T-profiles of longitudinal beams 2. Numerous other conventional ceiling systems have ceiling panels are mounted on beams 2, 3 in alternative manner. These alternative ceiling systems all lie within the reach of the skilled person, and a further description thereof is not provided herein. The framework of beams 2, 3 is fixed to the building construction (usually the storey floor) of the building using hangers 4. A catching device 14 can be mounted instead of a ceiling panel 15 on framework 2, 3, as shown in FIG. 1. For this purpose catching device 14 illustrated in FIG. 1 has substantially the same dimensions as a ceiling panel 15, which means that catching device 14 fits within the framework, this enhancing mounting of catching device 14.

Catching device 14 includes a light box consisting of an upright front and rear plate 5, an upright left and right-hand side plate 6 and a rear plate 16. Fluorescent lamp fittings 11 are provided, at least in the example embodiment shown in FIG. 2, in the tray close to the left and right-hand side plate 6. Fittings 11 are fastened to the holder, e.g., in a conventional manner, for instance, by screws. Fluorescent lamps 9 can be arranged in fittings 11, e.g., in a conventional manner, these fluorescent lamps emitting the desired UV light. Fittings 11 include a switching device with which the fluorescent lamps can be controlled. Fittings 11 are provided with supply voltage by power cable 12 and a plug 13. Standard sockets are provided in many cases on the underside of the storey floor so that fittings 11 can be readily connected to the domestic mains supply (for instance 220 V) using plug 13.

Figure 2:
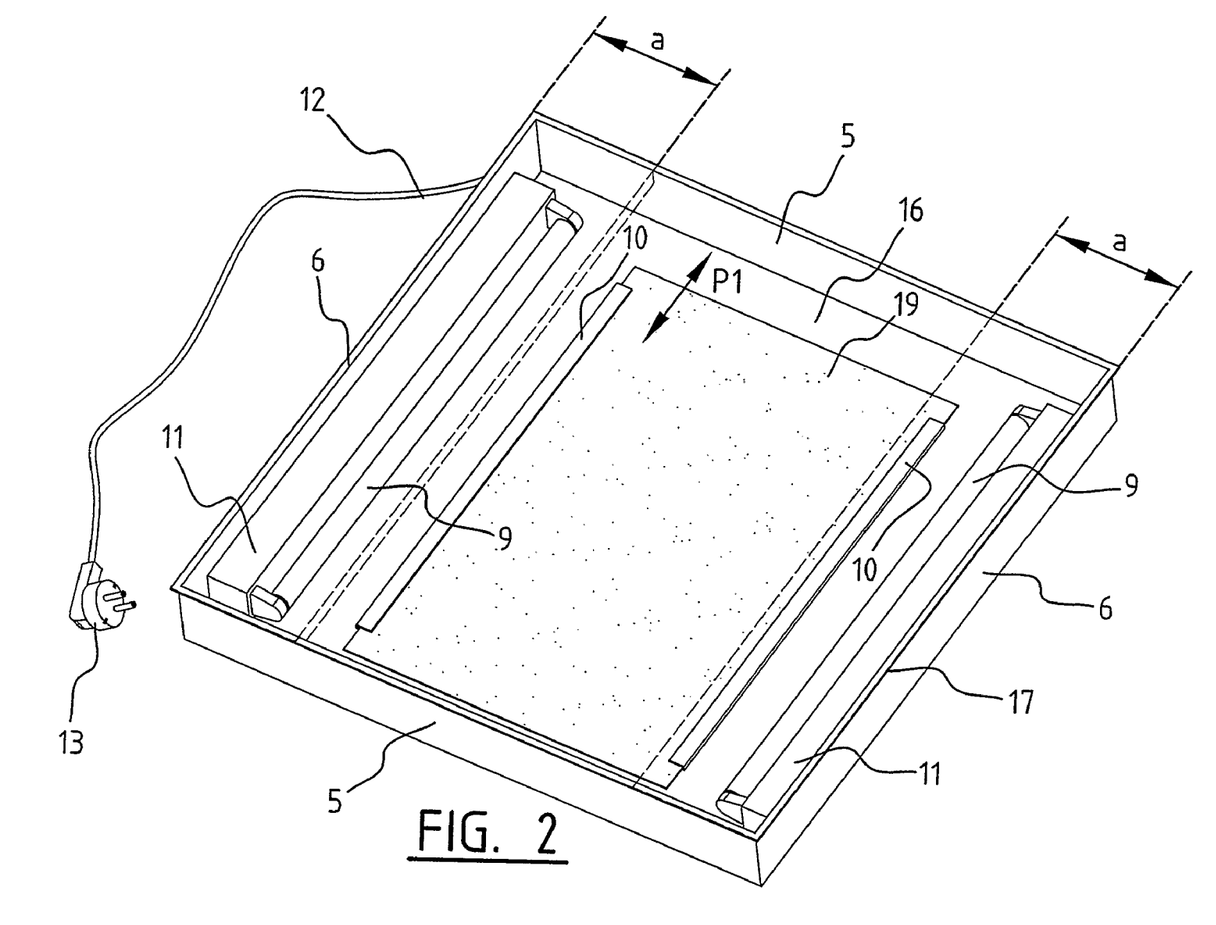
FIG. 2 is a (partly cut-away) perspective view of the ceiling system illustrated in FIG. 1.

A glue sheet 19 can be fixed against rear plate 16 of the holder, for instance, by sliding this glue sheet 19 between lips 10 (direction P1).

Fittings 11 and fluorescent lamps 9 are partially or wholly shielded by cover plates 7, as shown in FIG. 1. In FIG. 2, the cover plates are shown in broken lines in order to make visible the construction of the fittings and fluorescent lamps behind.

The whole of holder and fittings is placed, with support edge 17 of the holder, on the above mentioned flanges 8 of the longitudinal beams and possible transverse beams so that the whole is integrated into the system ceiling fully in accordance with the manner in which a ceiling panel 15 is arranged. In the example embodiment shown in FIG. 1, the holder can therefore be mounted in the system ceiling in simple manner by placing the holder between the beams, without sawing, drilling and/or screwing being necessary.

In the shown example embodiment, cover plates 7 are situated in almost the same plane as ceiling panels 15 so that ceiling 1 is quite flat on the visual side, which makes catching device 14 less noticeable. In other example embodiments, the holder can protrude slightly below ceiling 15 or, conversely, be further recessed into the ceiling. In another example embodiment cover plates 7 are also provided with a finishing, the appearance of which corresponds to that of ceiling panels 15 so that the catching device is even less noticeable.

Figure 4:
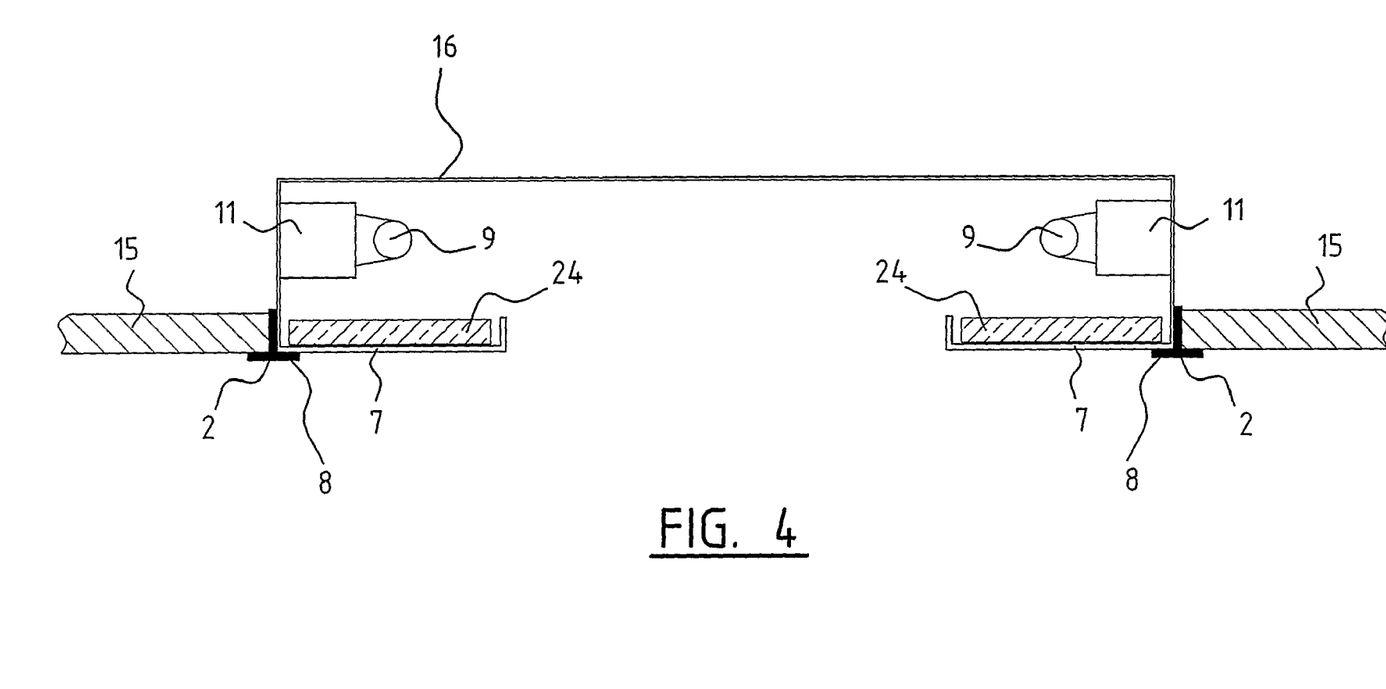
FIG. 4 is a perspective view of an example embodiment of the present invention.

In the shown example embodiment, the fluorescent lamps 9 are provided on either side of glue sheet 19. In other example embodiments, one of which is shown in FIG. 4, one or more glue sheets 24 are provided, as alternative or addition thereto, on the inner side (side opposite the visual side) of cover plates 7. During use, the fluorescent lamps emit UV light, whereby insects are attracted. Once an insect has arrived close to lamps 9, it will want to land in the vicinity of the lamp. In most cases, this will be at the position of glue sheet 19. As soon as the insect lands on glue sheet 19 the legs of the insect remain adhered to the sheet so that it cannot fly back into the space. When at a certain point glue sheet 19 is filled with insects, it can be easily removed, for instance, by sliding it out from between lips 10. It is also possible to provide other mechanisms for fastening glue sheet 19 to the holder, and these are deemed to be within the reach of the skilled person.

Because catching device 14 is arranged in the ceiling and therefore does not take up any wall space, optimal use can be made of the space in question. It is moreover the case that people do not generally tend to look at the ceiling when they are in a space. This means that glue sheet 19 with insects possibly caught thereon is not readily conspicuous, particularly when the glue sheet is recessed into the ceiling as in the example embodiment of FIG. 1, or goes completely unnoticed as in the example embodiments of FIGS. 3, 4 and 6. Cover plates 7 also extend from the upright walls so far toward the center of the holder (over distance A) that the light is shielded to some extent. Distance A is preferably chosen to be of a length such that there is no line of view between the user (for instance, in sitting or standing position) and any of the lamps 9. The UV light will be less noticeable to the user, thereby further reducing the chance that he/she will see the glue sheet. With the correct choice of distance A the attractive effect of the UV light is not adversely affected, or hardly so. In other example embodiments, for instance, example embodiments in which lamps 9 being in direct view is less problematic, cover plates 7 are omitted.

The attracting and catching effect of catching device 14 is in many cases stronger than if the catching device is disposed vertically, for instance, in the case of a catching device mounted against the wall.

In the example embodiment shown in FIG. 2, the fittings 11 of lamps 9 are placed parallel to rear plate 16 of the holder. This provides for an extremely limited height (for instance, 8 cm or less) of catching device 14 so that it requires only little space above the system ceiling, and can therefore be placed in almost all cases.

Figure 3:
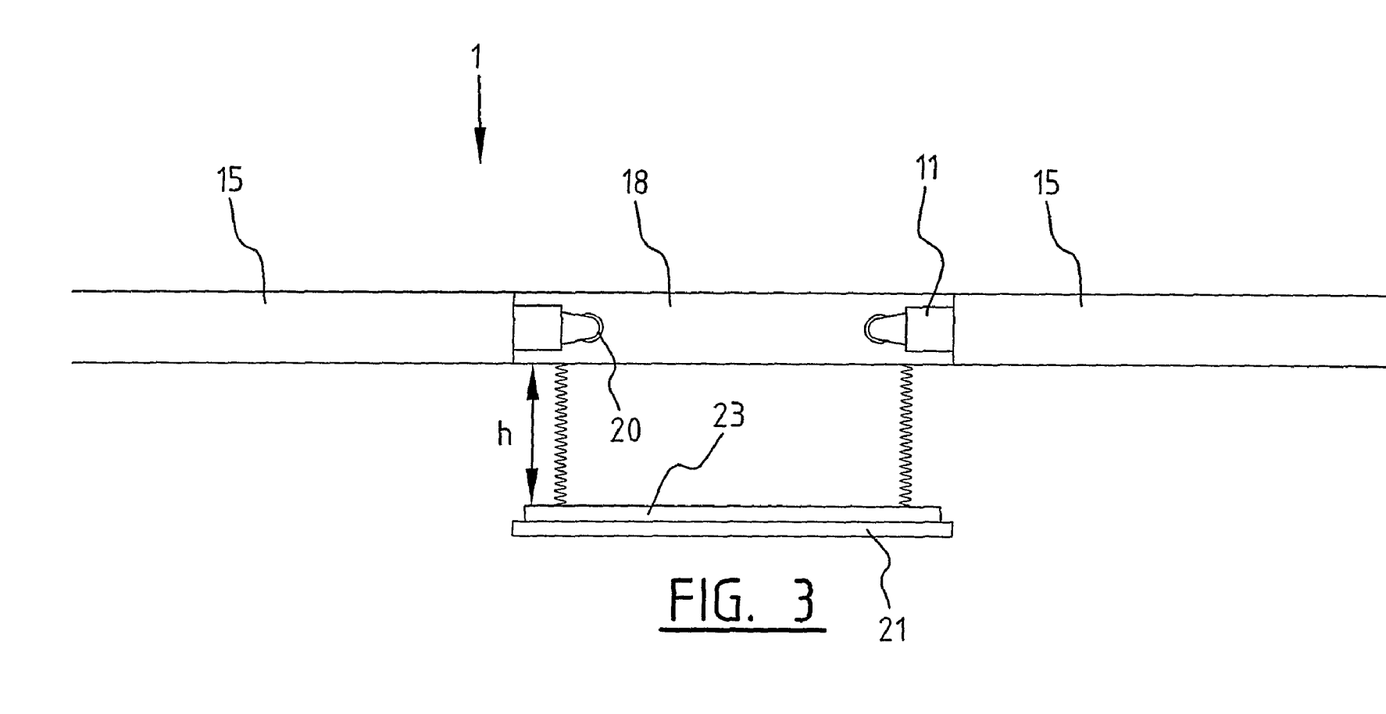
FIG. 3 is a perspective view of an example embodiment of the present invention.
Figure 5:
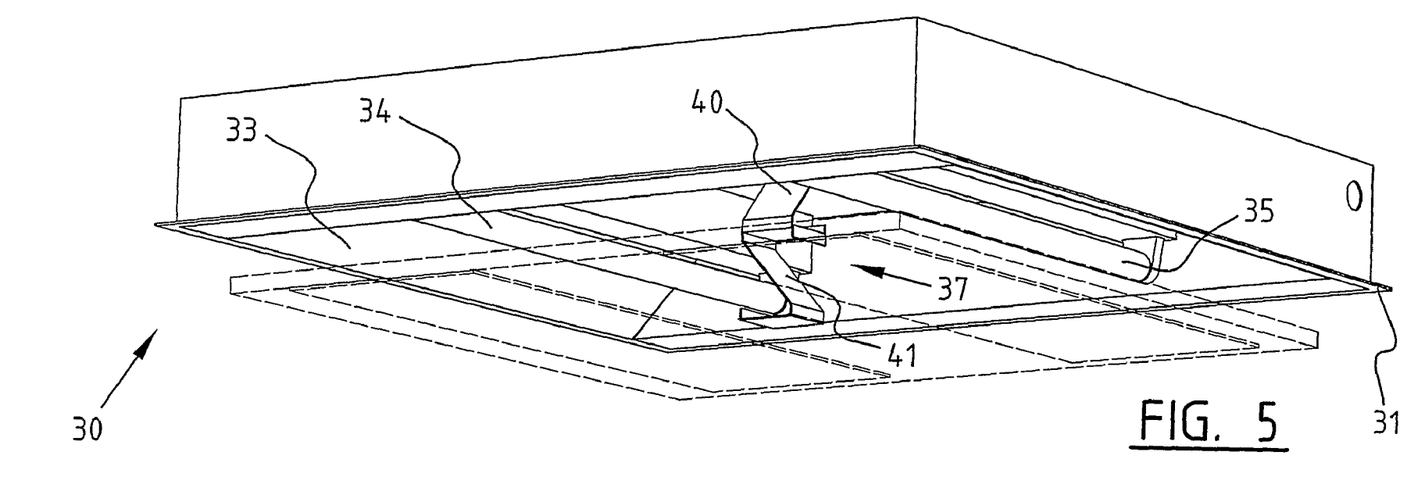
FIG. 5 is a perspective view of an example embodiment of the present invention.
Figure 6:
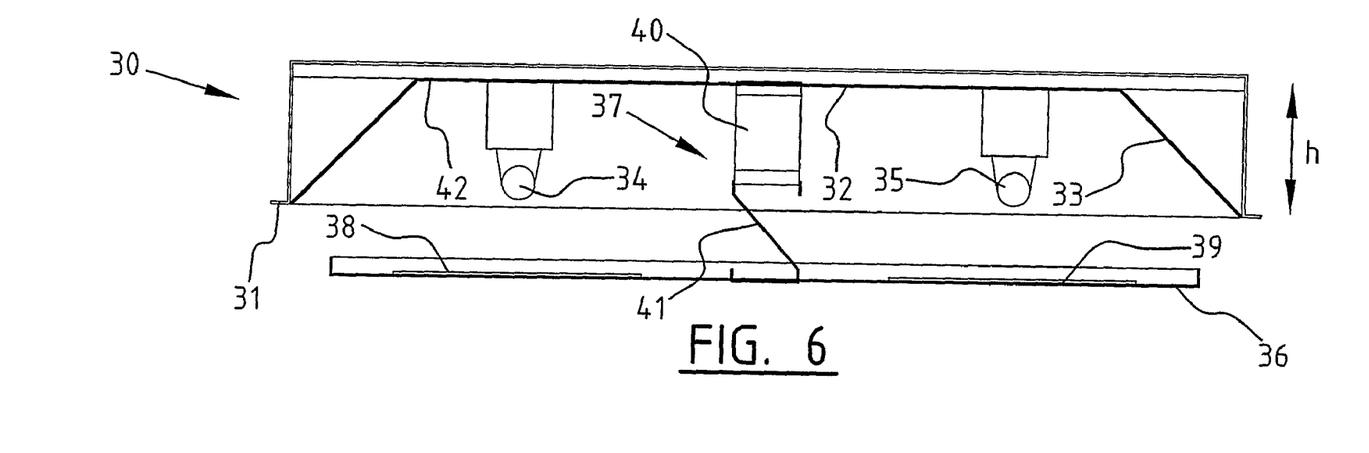
FIG. 6 is a cross-sectional view of the example embodiment illustrated in FIG. 6.

FIG. 3 shows an example embodiment. A system ceiling 1 is shown in which a number of standard light boxes 18 are arranged, e.g., in a conventional manner. In order to make the ceiling suitable for attracting insects, the lamps arranged in fittings 19 of a light box 18 are replaced with UV lamps 20. A horizontal cover plate 21 is arranged at a distance h (h about 8 cm) below the underside of the light box by mounting thereof on four spacers 22. A glue sheet 23 is provided on top of cover plate 21 for the purpose of fixing the insects attracted by UV lamps 20. In the shown example embodiment, cover plate 21 has the approximate dimensions of light box 18, although in other example embodiments the dimensions are larger or smaller than those of the light box. When the dimensions of cover plate 21 are as great as or greater than those of the light box, the cover plate is always situated in the line of view between the user of the space and the lamps in the light box, so that the user only sees indirect light. Glue sheet 23 is provided on the upper side of cover plate 21 so that the insects adhered thereto are not in the view of the user, which is positive for the appearance of this example embodiment. FIGS. 5 and 6 show an example embodiment in which the holder 30 has a tray-like form and is constructed from a flat part 32, along the peripheral edges of which an upward sloping wall 33 is arranged. The flat part and/or the sloping part can form part of holder 30 itself, but can also be provided in the form of a separate reflection plate 42 (FIG. 6). In order to provide a good reflection of the UV light from the UV light-emitting lamps 34, 35, the reflection plate and/or the holder is manufactured from polished aluminum. The form of the holder also has a positive effect on the quantity and direction of the reflected light.

Holder 30 also includes a support edge 31 which is arranged along the periphery and with which the holder can be placed on longitudinal beams 2 and/or transverse beams 3 of a system ceiling 14. The holder dimensions in longitudinal direction, in transverse direction or in both longitudinal and transverse directions are adjusted to the intermediate distance between respectively successive transverse beams, successive longitudinal beams or both the transverse and longitudinal beams, so that the holder can be placed between the beams without problem, i.e., without additional measures.

Using a suspension system 37, the cover plate 36 is provided at a fixed distance under the holder. Arranged on the upper side of the cover plate are glue sheets 38 and 39 to which the insects adhere.

The insect-attracting light is provided by two lamps 34, which are positioned opposite each other and which extend in respectively the left and right-hand peripheral area of the holder. Lamps 34, 35 hereby not only provide a uniform distribution of the light above the flat part 32 and the oppositely positioned cover plate 36, but also provide a catching space extending around the holder, i.e., through substantially 360°.

Suspension system 35 consists of two Z-shaped hooks 40 and 41. Upper hook 40 is fixed to holder 30, while lower hook 41 is fixed to cover plate 36. Due to the shown Z-shape, the lower hook 41 can be readily fastened to upper hook 39. This means that cover plate 36 can be mounted and removed easily and quickly, which enhances the convenience of replacing glue sheets 38, 39 provided on cover plate 36.

The height (h, FIG. 6) of the catching device in a situation in which it is recessed into the ceiling is determined only by the height of holder 30. The height of the holder (typically between 5 and 15 cm) is of the same order of magnitude as the height of the light fitting and the lamps, thus providing an extremely compact unit. If furthermore the fittings are replaced by fluorescent lamp bases arranged on the tray, the height (h) can be limited even further. This makes it possible to also apply the device in situations in which only little space is available between the system ceiling and the floor.

Glue sheets are generally made up of a cardboard or plastic sheet to which a layer of glue is applied, which is optionally provided with a determined substance or combination of substances which attracts insects (such as pheromones, sweeteners, etc.). In an example embodiment in which the glue sheet is placed in a hanging position, a PVC base must always be used due to sagging. It is possible to provide cover plates in many different arrangements: coated steel sprayed in any RAL color, stainless steel, plastic, and, for instance, also the system ceiling panel itself.

It should be understood that the present invention is not limited to the example embodiments described herein and that the example embodiments may be modified without departing from the spirit and scope of the present invention.

The invention claimed is:

1. A device for catching insects in a building space, comprising:
    a holder;
    a first electrical lamp and a second electrical lamp, each lamp arranged to emit ultraviolet light to attract insects, the lamps mounted on the holder in a peripheral area of the holder and at a distance from each other;
    a connection device adapted to connect the lamps to an electrical main supply;
    at least one cover plate having a peripheral plate edge mountable on the holder to at least partially shield the lamps;
    at least one fixing device adapted to fix insects attracted by the light of the lamps;
    a mounting device adapted to mount the holder in a ceiling of the building space; and
    a first spacer device, the first spacer device connecting the cover plate to the holder at a predetermined distance around an entire peripheral plate edge of the cover.

2. The device according to claim 1, wherein the lamps are positioned along at least two opposite peripheral edges of the holder to illuminate the fixing device from at least two sides.

3. The device according to claim 1, further comprising a second spacer device positioning the cover plate at a predetermined distance under the holder to shield the lamps.

4. The device according to claim 3, wherein the second spacer device includes a first hook arranged on the holder and a second hook, engageable with the first hook, arranged on the cover plate.

5. The device according to claim 4, wherein each hook is substantially Z-shaped.

6. The device according to claim 1, wherein at least one fixing device is arranged on a top side of the cover plate.

7. The device according to claim 1, wherein the fixing device is arranged in a central area of the cover plate.

8. The device according to claim 1, wherein the fixing device includes at least one glue sheet.

9. The device according to claim 1, wherein the mounting device includes at least one support edge provided along a periphery of the holder so that the holder is arrangeable on a ceiling system including longitudinal and transverse beams.

10. The device according to claim 1, wherein the holder is dimensioned to be arrangeable to fit between at least one of (a) longitudinal beams and (b) transverse beams of a system ceiling.

11. The device according to claim 1, wherein a length and a width of the cover plate correspond to a length and a width of the holder.

12. The device according to claim 1, wherein the holder includes a reflection plate.

13. The device according to claim 12, wherein the reflection plate at least partially includes polished aluminum.

14. The device according to claim 12, wherein at least one of (a) the holder and (b) the reflection plate include obliquely disposed surfaces arranged to reflect light along a cover plate arranged under the at least one of (a) the holder and (b) the reflection plate.

15. A ceiling system, comprising:
    a plurality of at least one of (a) longitudinal beams arrangeable in a longitudinal arrangement and (b) transverse beams arrangeable in a transverse arrangement in a building space;
    a plurality of ceiling panels arrangeable on the at least one of (a) the longitudinal beams and (b) the transverse beams;
    at least one insect catching device including:
    a holder;
    a first electrical lamp and a second electrical lamp, each lamp arranged to emit ultraviolet light to attract insects, the lamps mounted on the holder in a peripheral area of the holder and at a distance from each other;
    a connection device adapted to connect the lamps to an electrical main supply;
    at least one cover plate having a peripheral plate edge mountable on the holder to at least partially shield the lamps;
    at least one fixing device adapted to fix insects attracted by the light of the lamps;
    a mounting device adapted to mount the holder in a ceiling of the building space; and
    a first spacer device, the first spacer device connecting the cover plate to the holder at a predetermined distance around an entire peripheral plate edge of the cover;
    wherein the holder is dimensioned to be arrangeable to fit between the at least one of (a) the longitudinal beams and (b) the transverse beams.

16. The ceiling system according to claim 15, wherein at least one of (a) a length and (b) a width of the holder corresponds substantially to respective intermediate spaces between successive ones of the at least one of (a) the longitudinal beams and (b) the transverse beams.

17. The ceiling system according to claim 15, wherein the holder includes a support edge for placement of the holder on at least one of (a) the longitudinal beams and (b) the transverse beams.

18. The ceiling system according to claim 15, wherein the holder is recessed at least partially into the ceiling.

19. A ceiling, comprising:
    a plurality of at least one of (a) longitudinal beams arranged in a longitudinal arrangement and (b) transverse beams arranged in a transverse arrangement in a building space;
    a plurality of ceiling panels arranged on the at least one of (a) the longitudinal beams and (b) the transverse beams;
    at least one insect catching device including:
    a holder;
    a first electrical lamp and a second electrical lamp, each lamp arranged to emit ultraviolet light to attract insects, the lamps mounted on the holder in a peripheral area of the holder and at a distance from each other;
    a connection device adapted to connect the lamps to an electrical main supply;

at least one cover plate having a peripheral plate edge mountable on the holder to at least partially shield the lamps;
at least one fixing device adapted to fix insects attracted by the light of the lamps;
a mounting device, the holder mounted by the mounting device in the ceiling of the building space; and
a first spacer device, the first spacer device connecting the cover plate to the holder at a predetermined distance around an entire peripheral plate edge of the cover;
wherein the holder is arranged between the at least one of (a) the longitudinal beams and (b) the transverse beams.

20. The device of claim 1, wherein the first spacer device is arranged between the first electrical lamp and the second electrical lamp.

21. The ceiling system of claim 15, wherein the first spacer device is arranged between the first electrical lamp and the second electrical lamp.

22. The ceiling of claim 19, wherein the first spacer device is arranged between the first electrical lamp and the second electrical lamp.

* * * * *